(12) United States Patent
Ksiezopolski

(10) Patent No.: US 9,038,322 B2
(45) Date of Patent: May 26, 2015

(54) ADJUSTABLE RESILIENT SEAL WITH BENDABLE BULB PORTIONS

(71) Applicant: Edwin E Ksiezopolski, Granger, IN (US)

(72) Inventor: Edwin E Ksiezopolski, Granger, IN (US)

(73) Assignee: Lifetime Industries, Inc., Elkhart, IN (US)

( * ) Notice: Subject to any disclaimer, the term of this patent is extended or adjusted under 35 U.S.C. 154(b) by 0 days.

(21) Appl. No.: 14/160,122

(22) Filed: Jan. 21, 2014

(65) Prior Publication Data

US 2014/0203522 A1    Jul. 24, 2014

Related U.S. Application Data

(60) Provisional application No. 61/753,985, filed on Jan. 18, 2013.

(51) Int. Cl.
*E04H 1/00* (2006.01)
*F16J 15/02* (2006.01)

(52) U.S. Cl.
CPC .............. *F16J 15/022* (2013.01); *F16J 15/027* (2013.01)

(58) Field of Classification Search
USPC ......... 52/79.1, 79.5, 2.12, 2.14, 173.2, 788.1, 52/716.1, DIG. 15
See application file for complete search history.

(56) References Cited

U.S. PATENT DOCUMENTS

| | | | | |
|---|---|---|---|---|
| 6,048,016 | A * | 4/2000 | Futrell et al. ............... | 296/26.13 |
| 7,380,854 | B1 * | 6/2008 | Hanser et al. .............. | 296/26.13 |
| 7,614,676 | B2 * | 11/2009 | Ksiezopolski et al. .... | 296/26.09 |
| 7,614,677 | B2 * | 11/2009 | Ksiezopolski et al. .... | 296/26.09 |
| 8,366,168 | B1 * | 2/2013 | Ksiezopolski et al. .... | 296/26.01 |
| 8,382,124 | B2 * | 2/2013 | Ksiezopolski et al. ....... | 277/644 |
| 8,408,625 | B1 * | 4/2013 | Ksiezopolski et al. .... | 296/26.09 |
| 2008/0116707 | A1 * | 5/2008 | Boaz et al. ................. | 296/26.01 |
| 2008/0265618 | A1 * | 10/2008 | Cadena et al. ............... | 296/175 |

* cited by examiner

*Primary Examiner* — Mark Wendell
*Assistant Examiner* — Keith Minter
(74) *Attorney, Agent, or Firm* — Botkin & Hall, LLP

(57) ABSTRACT

A resilient seal for mobile living quarters around a slide out room that includes a pair of attaching members extending along the inside and outside surfaces of the main living area wall at an aperture through which the slide out room moves and further includes a connecting member extending between the attaching members and along the edge of the wall defining the aperture. A wiper seal extends from the connecting member to flex against the walls of the slide out room, and the connecting member further includes an accordion pleat for adjusting the distance between the attaching members to thereby accommodate walls of different thicknesses.

14 Claims, 4 Drawing Sheets

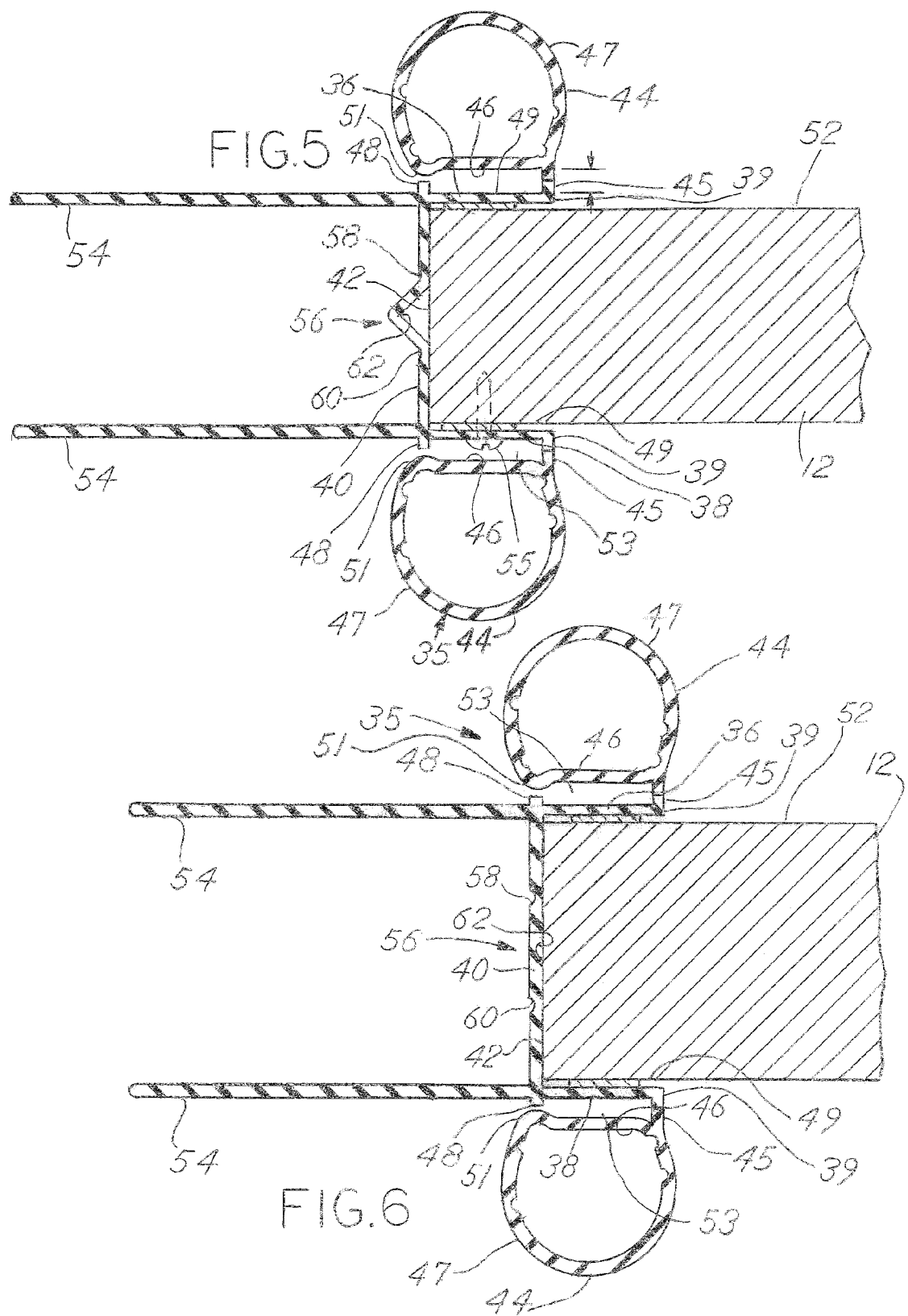

ADJUSTABLE RESILIENT SEAL WITH BENDABLE BULB PORTIONS

CROSS REFERENCE TO RELATED APPLICATIONS

This application claims the benefit of U.S. Application Ser. No. 61/753,985 filed Jan. 18, 2013, the disclosure of which hereby incorporated by reference.

BACKGROUND OF THE INVENTION

Recreational vehicles such as motor homes and travel trailers are commonly equipped with one or more slide out rooms that are retracted within the main living quarters when the unit is transported, but can be extended from the main living quarters to provide auxiliary space when the unit is parked. Commonly, bulb seals extend around the aperture defined in the outside of the sidewall of the main living quarters through which the slide out room extends and retracts. This seal is engaged by a first flange on the exterior side of the slide out room to seal the gap between the slide out room and the main living quarters when the slide out room is retracted. Similarly, a second bulb seal extends around the aperture on the inside of the sidewall and is engaged by a second flange on the interior side of the slide out room when the slide out room is extended for use. Wiper seals are mounted on sidewalls adjacent to the aperture and are flexed against corresponding walls of the slide out room. The bulb seals seal the slide out room in the extended and retracted positions, and the wiper seal wipes against the slide out room as it is extended and retracted to prevent moisture and debris from entering the vehicle. Similar prior art seals are disclosed in U.S. Pat. Nos. 7,614,676 and 7,614,677.

While the seals of the aforementioned patents accomplished their task successfully, there were multiple parts to the seals. On each mounting member a separate bulb seal had to be installed onto its corresponding mounting portion. Ideally, a single seal installed all at once would simplify installation.

SUMMARY OF THE INVENTION

According to the invention, a resilient seal for mobile living quarters is provided for sealing around a slide out room of mobile living quarters having an aperture slidably receiving a slide out room. The resilient seal has a pair of attaching members extending along the inside and outside surfaces of the main living area wall at the aperture and further include a connecting member extending between the attaching members and along the edge of the wall defining the aperture. A wiper seal extends from the connecting member that flexes against the walls of the slide out room, and the connecting member further includes an accordion pleat for adjusting the distance between the attaching members to accommodate walls of different thicknesses.

BRIEF DESCRIPTION OF THE DRAWINGS

FIG. 5 is a sectional view of the seal shown in FIG. 4;
and
FIG. 6 is a view of the seal shown in FIG. 5 showing the seal in its fully opened position.

DETAILED DESCRIPTION OF INVENTION

Figure 1:
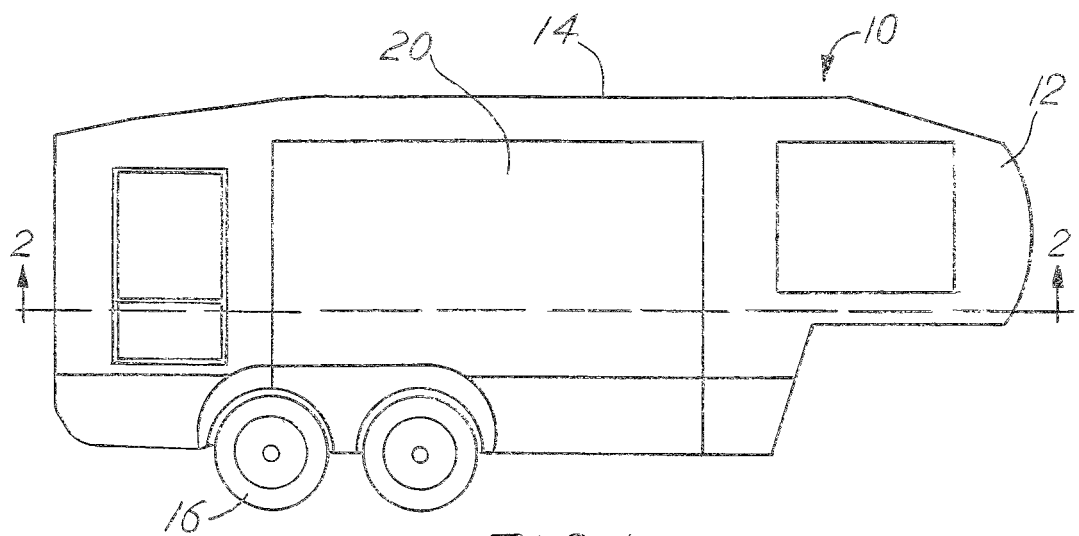
FIG. 1 is a perspective view of the trailer.
Figure 2:
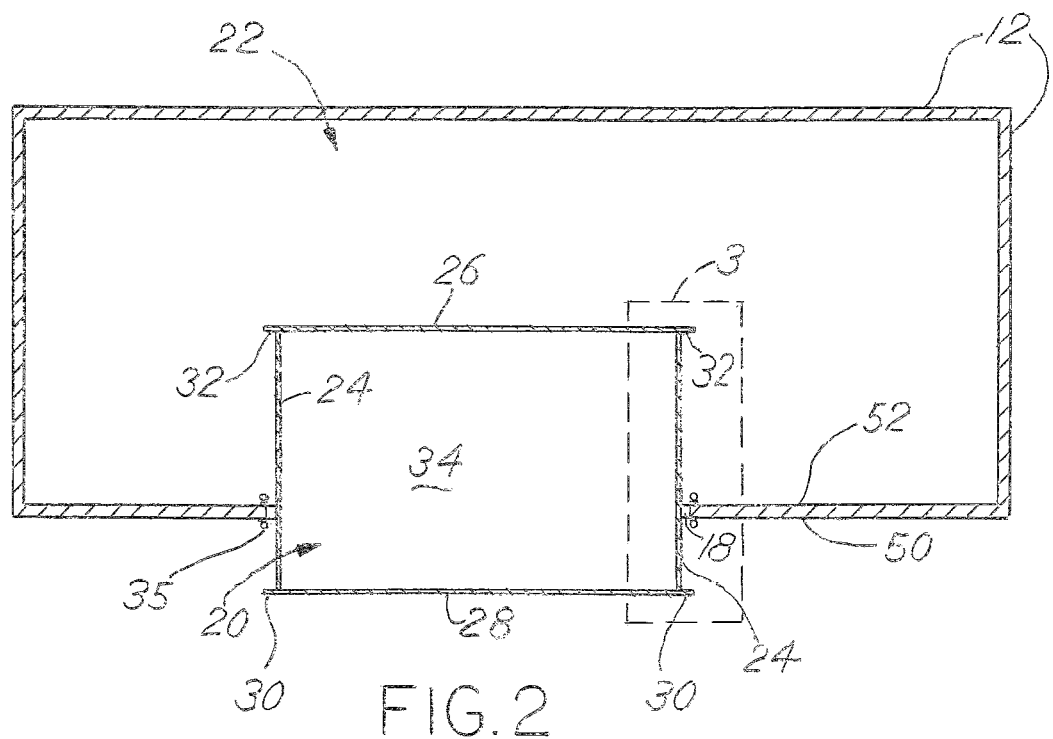
FIG. 2 is a cross-sectional view taken about the line 2-2 in FIG. 1.
Figure 3:
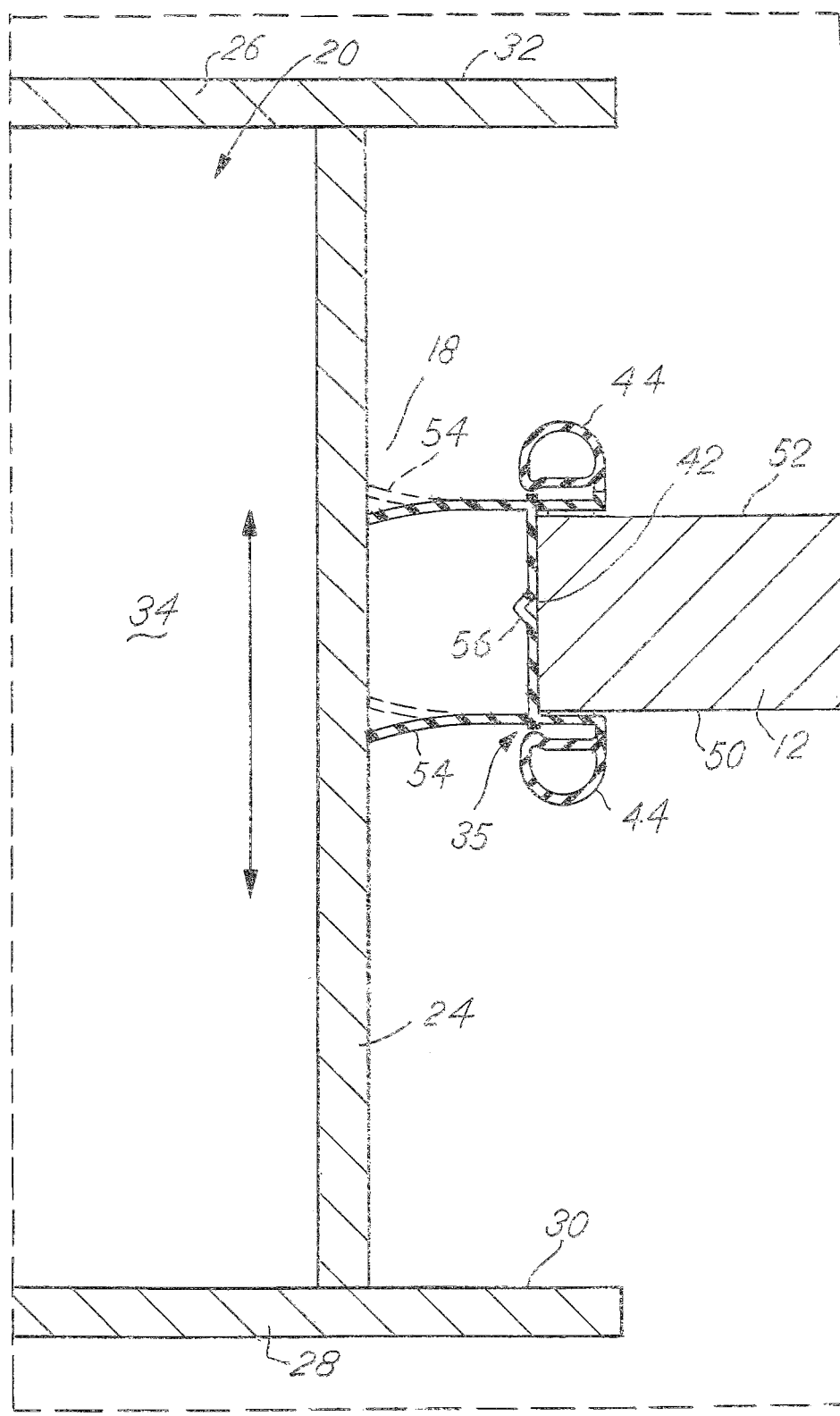
FIG. 3 is a magnified view of area 3 in FIG. 2.

Referring now to the drawings, mobile living quarters, such as the fifth wheel recreational vehicle generally indicated at 10, includes side walls 12 and a ceiling wall 14. The mobile living quarters 10 is mounted on wheels 16 for transport. An aperture 18 is provided in one of the side walls 12 and slidably receives a slide out room 20. This is best seen in the magnified view shown in FIG. 3. The side walls 12 and ceiling wall 14 cooperate to define a main living area generally indicated by the numeral 22 in FIG. 2. The slide out room 20 includes side walls 24, a ceiling wall 26, and a front wall 28. As known to those skilled in the art, the slide out room 20 is mounted for movement through the aperture 18, so that it may be retracted into the main living quarters 22 when the unit is transported, but can be extended from the main living quarters when the unit is parked, thereby providing auxiliary living space. The slide out room 20 includes an exterior flange 30 extending around the side walls 24 and ceiling wall 26. The slide out room 20 includes another flange 32, being an interior flange, extending around the side walls 24 and ceiling wall 26 at the ends thereof opposite the ends joined to the front wall 28. The side walls 24, ceiling wall 26 and front wall 28 cooperate to define an auxiliary living area 34, which is available for use when the unit is parked and the slide out room 20 is moved to the extended position.

It is necessary to assure that moisture, dirt, debris, etc. be prevented from entering the living quarters. Seals 35 are installed adjacent to the aperture 18. Each seal 35 must provide sealing at the extended position, retracted position, and all intermediate positions. Accordingly, the seal 35 includes a bulb portion 44 mounted around the aperture on the exterior surface and the interior surface of the side wall 12 adjacent the aperture 18, and a wiper seal 54 engages the side walls 24 and ceiling wall 26 of the slide out room to wipe against the walls as the slide out room 20 extends and retracts. Preferably, the seal 35 is made continuously through an extrusion process and is consistent along its entire length, so that an appropriate length can be cut off and installed.

Figure 4:
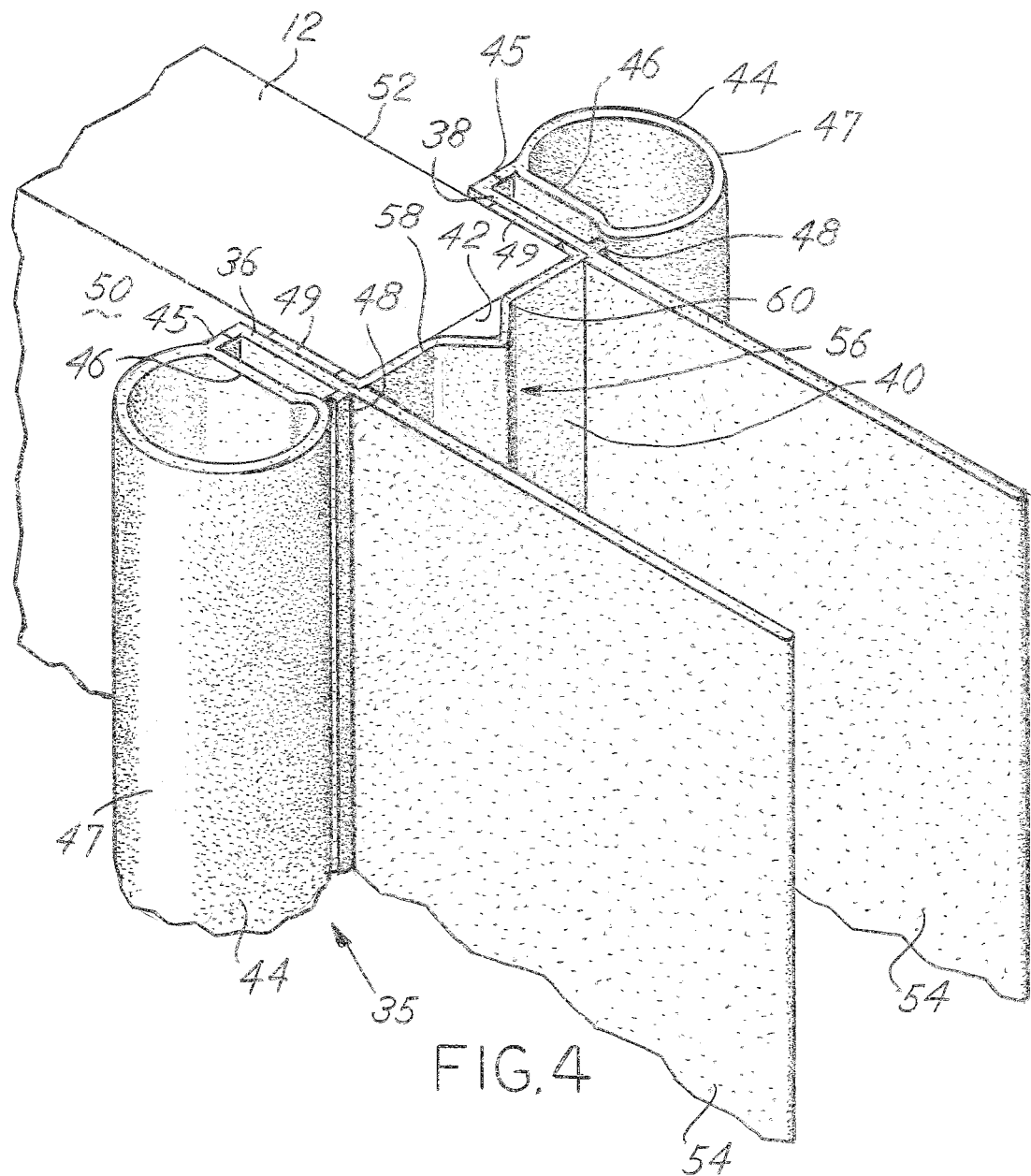
FIG. 4 is a perspective view of the seal installed on a sidewall.

FIG. 4 shows the seal in perspective as it is assembled onto a sidewall 12. Seal 35 has a pair of longitudinal attachment members 36, 38, which are connected by a longitudinal connecting member 40, which extends over the transverse edge 42 of the sidewall 12. The attachment members each have terminal ends 39 that define the farthest end of the attachment members 36, 38 from the connecting member 40, as shown in FIG. 5. Bulb portions 44 are integrally connected to the attachment members 36, 38. Each bulb portion 44 has an offsetting member 45 that extends from the bulb portion 44 to its corresponding attachment member 36, 38. The offsetting members 45 extend from the terminal ends 39 of the mounting portions perpendicularly to their respective mounting portions 36, 38. The bulb portions 44 have an inner wall 46 and an outer portion 47 that is arcuately shaped. The inner wall 46 is substantially parallel to the mounting portion for a majority of its length. The inner wall includes a rounded protrusion 51 that extends toward a corresponding mounting portion 36, 38. This is shown in FIG. 5. This places the protrusion 51 closer to its corresponding attachment member 36, 38 than the inner wall 46. The bulb portions 44 are hollow as shown in FIGS. 4-6 and made of a lower durometer material than the attachment members 36, 38. Each attachment member 36, 38 includes a rib 48 that extends from the attachment member 36, 38 toward its corresponding bulb portion 44. Each rib 48 is directly opposite and adjacent the protrusion 51 so that compression of a bulb portion 44 will cause each protrusion 51 to contact a corresponding rib 48. The offsetting member 45 spaces the inner wall 46 from the attachment member 36, 38 by a predetermined distance. The offsetting member 45 adjacent to the bulb portion 44 is made from the same material as the bulb portion 44. The portion of the offsetting member 45 adjacent to its corresponding attachment member 36, 38 is made of the same higher durometer material as that of the attachment member 36, 38. The material of the bulb portion 44 and that of the mounting portion 36, 38 extend approximately half of the distance between the inner wall 46 and mounting portion 36, 38. As such, the bulb portion 44 is easily bent back to expose the attachment member 36, 38. FIGS. 5 and 6 show the different materials as indicated by the hatching. The rib 48 may be approximately the same length as the offsetting member 45 or slightly shorter. The rib 48 is made of the same material as that of the mounting portion 36, 38. As shown in FIG. 6, if the rib 48 is slightly shorter than the offsetting member, the protrusion 51 may nearly contact the rib 48. It is possible that the rib 48 be slightly longer than that shown in FIG. 6 so that the protrusion 51 may contact the rib 48. The offsetting member 45, corresponding attachment member 36, 38, rib 48, and inner wall 46 form a pocket 53 that is capable of hiding mechanical fasteners such as screws 55 driven through the mounting portions 36, 38. FIG. 5 illustrates this.

Different manufacturers of mobile living quarters manufacture the sidewalls 12 from different materials and thus, the sidewalls 12 of different manufacturers are of different thicknesses. It is clearly desirable that the number of different variations of the seal assembly 35 be minimized. Accordingly, an accordion pleat 56 extends along the length of the connecting member 40 to permit the width of the connecting member 40 to be adjusted, to thereby accommodate walls of varying thicknesses, as illustrated in FIGS. 5 and 6.

In FIGS. 4 and 5, the seal 35 is in the "closed" or narrow position, to accommodate a relatively narrow sidewall. In this position, the accordion pleat 56 projects into the space between the wiper seals 54. In FIG. 6, the seal assembly is in the "open" position, which accommodates the widest sidewall. In this position, the accordion pleat 56 is stretched out so that the connecting member 40 lies substantially flat against the transverse edge 42. It will be noted that as the attachment members 36, 38 are secured to their corresponding inside and outside surfaces 52, 50, the width of the connecting member 40 automatically adjusts to accommodate a sidewall 12 of any thickness between those accommodated by the fully open and fully closed position of FIG. 6. The pleat 56 is formed by scoring parallel, longitudinal score lines 58, 60 on the side of the connecting member 40 facing away from the transverse edge 42 and between the wiper seals 54, and by forming a third longitudinal score line 62 on the side of the connecting portion 40 that lies against the transverse edge 42 when the seal assembly is installed on the sidewall. The third score line 62 extends parallel to the score lines 58, 60 and is located midway between the latter. The first 58, second 60 and third 62 score lines define corresponding first, second and third fold lines, thereby forming the accordion pleat 56.

To facilitate installation of the seal 35 on the unit 10, a strip of double sided adhesive tape 49, is connected to the attachment member 38 to the side facing the sidewall 12. The opposite side of the adhesive tape 49, that is not connected to the attachment member 38, is covered by a protective removable coating that prevents it from sticking to anything. Likewise, the attachment member 36 includes a strip of double sided adhesive tape 49 attached to it and protected with a protective removable coating on the side that faces the side wall 12.

After the adhesive tape is attached to the outer surface 50 and inner surface 52 of the side wall 12, the seal 35 may be more securely attached to the corresponding inside and outside surfaces 52 and 50 by appropriate mechanical fasteners. Screws or nails may be driven through the attachment members 36, 38 into the side wall 12. This may be accomplished by bending back the bulb portions 44 to expose the attachment members 36, 38. Wiper seals 54 extend from the connecting portion 40 and are adapted to flex against the side walls 24 and ceiling wall 26 of the slide out room 20 during extension and retraction of the latter.

The present invention is not limited to the details given above, but may be modified within the scope of the following claims.

What is claimed is:

1. A resilient seal for mobile living quarters having main living area walls defining a main living area, an aperture in one of said main living area walls slidably receiving a slide out room having slide out room walls defining auxiliary living space, said one main living area wall having an outside surface, an inside surface, and a transverse surface extending between the inside and outside surfaces, said transverse surface defining said aperture, said resilient seal having a pair of attaching members extending along said one main living area wall adjacent to said aperture, each said attaching member including a bulb portion integrally attached thereto by an offsetting member spacing said bulb portion from its corresponding attachment member and a connecting member extending between said attaching members and along said transverse surface, said connecting member including an adjuster for adjusting the distance between the attaching members, said adjuster includes an accordion pleat defined between first and second parallel score lines defining a pair of corresponding fold lines, and a third score line defining a third fold line between and extending parallel to said first and second score lines, each said attachment member includes a terminal end opposite said connecting member, said offsetting members extending from said terminal ends of said attachment member, said inner wall of each said bulb portion each includes a protrusion extending toward its corresponding attachment member, said protrusion on said bulb portion located oppositely to that of said offsetting member so that compression of said bulb portion toward its corresponding attachment member urges said protrusion to contact said attachment member.

2. The resilient seal as claimed in claim 1, said connecting member includes a wiper seal extending substantially perpendicularly therefrom and adapted for engaging one of said slide out room walls.

3. The resilient seal as claimed in claim 2, wherein said slide out room is movable between fully extended and fully refracted positions and carries a pair of offset flanges projecting outwardly from said slide out room walls, one of said flanges engaging a corresponding one of said bulb portions when said slide out room is in the fully extended position, the other flange engaging the other bulb portion when said slide out room is in the fully retracted position.

4. The resilient seal as claimed in claim 1, said attachment member includes an upstanding rib located opposite said offsetting member and extending toward said bulb portion, a terminal end on said rib being spaced from said attachment member, each said terminal end facing a corresponding inner wall of said bulb portion.

5. The resilient seal as claimed in claim 4, said protrusion contacting said terminal end on said corresponding rib when said bulb portion is compressed toward its corresponding attachment member.

6. The resilient seal as claimed in claim 1, said bulb portion pivotable about said offsetting member between a resting position and an installation position, said resting position defined by said protrusion relatively close to said attachment member, said installation position defined by said protrusion relatively far from said attachment member.

7. A resilient seal for living quarters having main living area walls defining a main living area, an aperture in one of said main living area walls slidably receiving a slide out room having slide out room walls defining auxiliary living space, said one main living area wall having an outside surface, an inside surface, and a transverse surface extending between the inside and outside surfaces, said transverse surface defining said aperture, said seal comprising;
- a pair of attaching members extending along said one main living area wall adjacent to said aperture, each said attaching member including a bulb portion flexibly attached thereto by an offsetting member, said bulb portions including an outer arcuate portion facing away from its corresponding attaching member, said arcuate portion integrally connected to an inner wall being adjacent to and spaced from said mounting member, and said inner wall of each said bulb portion being substantially parallel to said mounting member for the majority of its length, said arcuate portion and said inner wall being integrally joined so that said bulb portions are hollow;
- a connecting member extending between said attaching members and along said transverse surface, said connecting member including an adjuster for adjusting the distance between the attaching members, said adjuster includes an accordion pleat defined between first and second parallel score lines defining a pair of corresponding fold lines, and a third score line defining a third fold line between and extending parallel to said first and second score lines;
- said bulb portion pivotable about said offsetting member between a resting position and an installation position, said resting position defined by said inner wall relatively close to said attachment member, said installation position defined by said inner wall relatively far from said attachment member.

8. The resilient seal as claimed in claim 7, wherein said connecting member includes a wiper seal extending substantially perpendicularly therefrom and adapted for engaging one of said slide out room walls.

9. The resilient seal as claimed in claim 7, wherein attachment members include a terminal end opposite said connecting member, said offsetting members extending from said terminal ends of said attachment members, said attachment members including an upstanding rib extending toward said bulb portions, said ribs on said attachment members being spaced from said offsetting member, each said rib being located between a corresponding inner wall of said bulb portion and said attachment member.

10. The resilient seal as claimed in claim 9, wherein said inner walls of said bulb portions each include a protrusion extending toward corresponding ribs, said protrusion on said bulb portions located oppositely to that of said offsetting member so that compression of said bulb portion toward its corresponding attachment member urges said protrusion to contact said corresponding rib.

11. A resilient seal for mobile living quarters having main living area walls defining a main living area, an aperture in one of said main living area walls slidably receiving a slide out room having slide out room walls defining auxiliary living space, said one main living area wall having an outside surface, an inside surface, and a transverse surface extending between the inside and outside surfaces, said transverse surface defining said aperture, said seal being;
- a unitary seal having opposing attachment members connected at a first terminal end by an adjuster, said attachment members and said adjuster formed from a relatively high durometer material, each of said attachment members having an offsetting member extending substantially perpendicularly at a second terminal end of said attachment member opposite said first terminal end, said offsetting member formed from a relatively low durometer and integrally connecting a bulb sealing portion of a substantially same durometer;
- said bulb sealing portion including an outer arcuate portion facing away from its corresponding attachment member, said arcuate portion integrally connected to an inner wall being adjacent to and spaced from said attachment member, and said inner wall of each said bulb portion being substantially parallel to said attachment member for the majority of its length, said arcuate portion and said inner wall being integrally joined so that said bulb portions are hollow;
- said bulb portion including a protrusion located between said inner wall and said arcuate portion at a point opposite said offsetting member, said attachment member having a rib extending substantially perpendicular therefrom toward said protrusion;
- a wiper seal extending substantially coplanar to said attachment member and formed from a lower durometer material.

12. The seal of claim 11, said wiper seal extending from said attachment member and located oppositely said first terminal end.

13. The seal of claim 11, said bulb portion pivotable about said offsetting member between a resting position and an installation position, said resting position defined by said inner wall relatively close to said attachment member, said installation position defined by said inner wall relatively far from said attachment member.

14. The resilient seal as claimed in claim 11, said wiper seal extending substantially perpendicularly from said connecting member and adapted for engaging one of said slide out room walls.

* * * * *